(12) United States Patent
Lin

(10) Patent No.: US 6,252,684 B1
(45) Date of Patent: Jun. 26, 2001

(54) AUTOMATIC PAPER FEEDER INCLUDING AN UPPER LIGHT SOURCE

(75) Inventor: Chin-I Lin, TaoYuan (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/191,528

(22) Filed: Nov. 13, 1998

(51) Int. Cl.⁷ ....................................... H04N 1/04
(52) U.S. Cl. ............................. 358/498; 358/498
(58) Field of Search ................... 358/474, 486, 358/471, 488, 494, 497, 498

(56) References Cited

U.S. PATENT DOCUMENTS

| | | | |
|---|---|---|---|
| 4,954,862 | * | 9/1990 | Lee ............................................. 355/1 |
| 5,239,392 | * | 8/1993 | Suzuki et al. ........................ 358/474 |
| 5,781,311 | * | 7/1998 | Inoue et al. .......................... 358/474 |
| 5,959,737 | * | 9/1999 | Kaminaga ............................. 356/430 |
| 5,973,796 | * | 10/1999 | Schissler et al. ..................... 358/474 |
| 5,991,054 | * | 11/1999 | Hung ..................................... 358/474 |

* cited by examiner

Primary Examiner—Jerome Grant, II
(74) Attorney, Agent, or Firm—Dougherty & Troxell

(57) ABSTRACT

An automatic paper feeder including an upper light source comprises of a paper tray for holding a plurality of scanning documents, a base frame for mounting on the scanning platform of a scanner, a channel for guiding the scanning document to move along a desired direction and path, an upper light source, a transmission unit for picking up and moving the scanning document, a control unit for controlling the transmission unit and the upper light source, and a cable for wiring the automatic paper feeder to the scanner. The paper feeder enables the scanner to perform paper-feeding type scanning at high scanning efficiency. Beside providing automatic single page feeding, the automatic paper feeder also able to perform transparency scanning through its upper light source. The scanner equips with this automatic paper feeder thus able to perform dual function of reflective type and transparency scanning.

19 Claims, 3 Drawing Sheets

AUTOMATIC PAPER FEEDER INCLUDING AN UPPER LIGHT SOURCE

BACKGROUND OF THE INVENTION

1. Field of the Invention

This invention relates to an automatic paper feeder which includes an upper light source and particularly an automatic paper feeder for use with a scanner that is able to automatically feed paper and facilitate both reflective and transparent documents scanning functions.

2. Description of the Prior Art

Conventional flatbed type scanning and copying equipment such as optical scanners and copiers usually have a document placed on a transparent platform stationary, then having a scanning means moving across the transparent platform to perform scanning process. This type of scanning equipment can process only one piece of document at a time. Its operation is labor intensive and not efficient for high volume scanning work. To remedy this problem, an automatic paper feeder has been introduced. FIG. 1 shows an example of such device for scanning or copying machine use. The automatic paper feeder 1 includes a paper tray 11 which can hold a plurality of scanning documents 13 and a transmission unit 12 which has a plurality of rollers for automatically picking a sheet of document 13 at a time to feed into a channel 14. There is a cable 15 to wire the paper feeder 1 to a control circuit board 21 in a scanner 2. Then a software is employed to coordinate and control the operations of the paper feeder 1 and the scanner 2.

When in use, the transmission unit 12 picks up a document 13 and feeds it into the channel 14 until it laid upon a scanning platform 22. Then a scanning means 23 is activated to move across the scanning platform 22 to perform scanning process. After scanning completed, the transmission unit 12 discharges the document 13 from the scanning platform 22, and picks up another document in the paper tray 11 for another cycle of scanning operation.

In this type of scanner, the scanning document is laid stationary on the scanning platform during scanning process. Document movement is intermittent and becomes a drag on operation which is still not very efficient if a lot of documents are to be scanned. In addition, it suits only reflection type scanning work. As it has only a lower light source 231 located in the scanning means 23 to project light through the transparent scanning platform 22 upon the document 13 held in the channel 14. It generally is no good for transparency scanning (such as projection transparency, slide, negative film, and etc.) as the channel 14 has an allowance which makes the document cannot be held upon the platform closely or evenly. Therefore it often results in poor scanning quality such as double image, overlapping image or blurring image when performing transparency scanning.

SUMMARY OF THE INVENTION

In view of aforesaid disadvantages, it is therefore an object of this invention to provide an automatic paper feeder including an upper light source that moves the document against a stationary scanning means so that scanning process is continuous rather than intermittent. It thus greatly enhances scanning efficiency. Furthermore, the upper light source can provide light emitting through a transparent document when there is a need to perform transparency scanning. Reflection type scanning can also be performed by switching off the upper light source and use the lower light source in the scanning device for providing reflecting light. Its dual functionality is more flexible an versatile than conventional scanners.

In order to achieve aforesaid object, the automatic paper feeder according to this invention includes a paper tray which can hold a plurality of scanning documents, a base frame for mounting on a transparent platform of a scanner, a channel, an upper light source, a transmission unit for picking up document from the paper tray, a control unit for controlling the transmission unit and the upper light source, and a cable to connect the automatic paper feeder with the scanner. The base frame has a transparent zone at the bottom mating against the transparent platform of the scanner. The channel has one end engaging with the paper tray for receiving document and has another end extending over the transparent zone. The channel further has a transparent window and a reflection plate located above the transparent zone. The upper light source is located above the transparent window opposite to the transparent zone.

When in use, the base frame of the paper feeder of this invention is mounted on the scanner with the transparent zone located above the transparent platform. The scanning means of the scanner is moved to a desired position under the transparent zone. Then transmission unit picks up scanning document from the paper tray one by one continuously. The scanning document is carried by the transmission unit and passes the transparent zone and over the scanning means for scanning. The scanning documents are moving continuously while the scanning means is stationary. Therefore scanning process may be performed continuously like a feed-sheet type scanner at high speed rather than intermittently like a conventional flatbed type scanner. It thus has a much greater scanning efficiency.

When the scanning document is a transparency, the scanning means is moved under the transparent winder below the upper light source. The upper light source is turned on while a lower light source in the scanning means is turned off When the transparency passes over the transparent zone, the upper light source projects light through the transparency and trigger the scanning means to perform scanning process.

For reflective scanning, the scanning means is moved away from the transparent window and is located under the reflection plate. The upper light source is turned off while the lower light source is turned on. When an opaque document passes over the transparent zone, the lower light source projects light upon the opaque document and reflects the light back to the scanning means for scanning process. Therefore this invention can provide dual scanning function for one scanner.

In another embodiment of this invention, the automatic paper feeder may includes a pair of photo sensors (one emission member and one receiving member) located at two sides of the channel and in front of the transparent zone (in terms of paper movement direction). The photo sensors can detect if a passing document is transparent or opaque from light density difference at the receiving member, then activate the scanning means to move to a location desired for either transparency scanning or reflective scanning.

BRIEF DESCRIPTION OF DRAWINGS

The invention, as well as its many advantages, may be further understood by the following detailed description and drawings in which.

DETAILED DESCRIPTION OF THE PREFERRED EMBODIMENT

Figure 1:
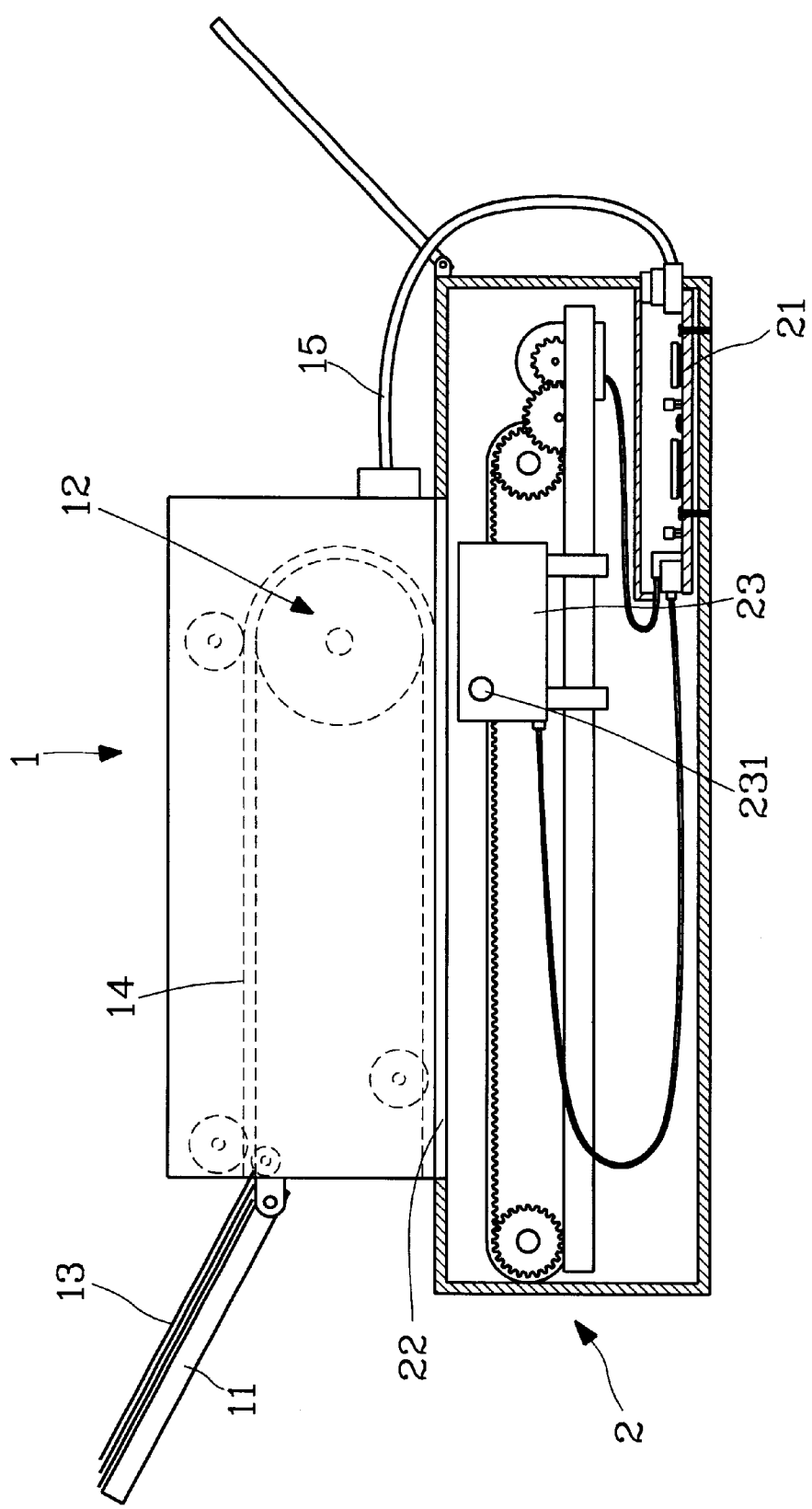
FIG. 1 is a schematic side view of a conventional automatic paper feeder used with a scanner.
Figure 2:
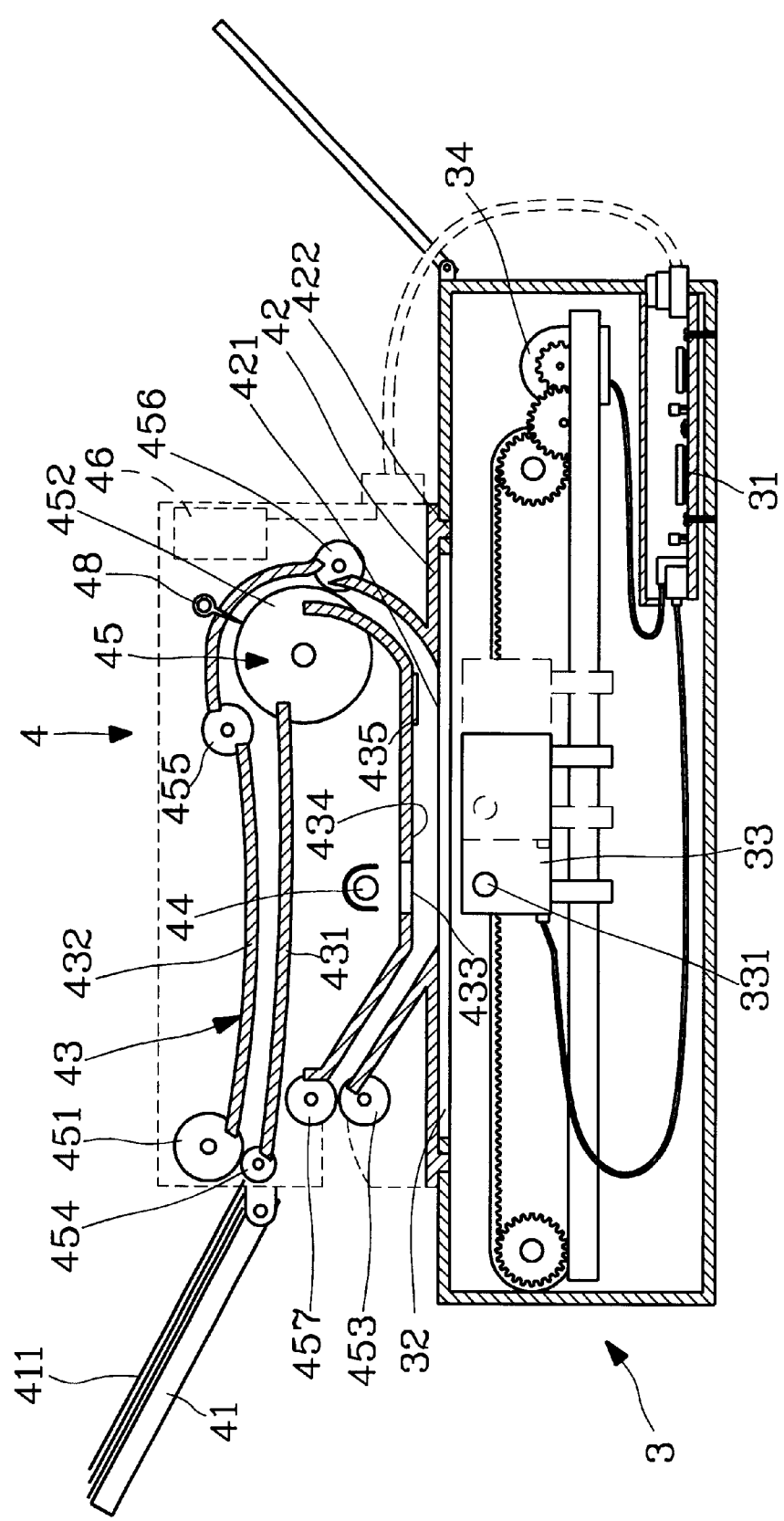
FIG. 2 is a sectional view of an embodiment of this invention used with a scanner.

FIG. 2 illustrates an automatic paper feeder 4 according to this invention for use with a scanner 3 that is able to scan transparency and opaque documents. The scanner 3 may be a flatbed type optical scanner or a copier. In the scanner 3, there are provided with a scanning means 33, a transmission means 34 and a control circuit board 31 for controlling operation of the scanning means 33 and the transmission means 34. The scanning means 33 includes a lower light source 331 and other required components. Taking a charged couple device (CCD) scanning means for instance, the optic components include at least one reflection mirror, a lens set and a CCD member (all these components are not shown in the figure). When the automatic paper feeder 4 of this invention is not being used with this scanner 3, the transmission means 34 may drive the scanning means 33 to move along a scanning platform 32 for scanning a document placed upon the transparent scanning platform 32.

The automatic paper feeder 4 includes a paper tray 41 which can hold a plurality of scanning documents 411, a base frame 42 mountable on the scanning platform 32, a channel 43, an upper light source 44, a transmission unit 45 for picking up documents 411 and moving them along the channel 43, an upper light source 44, a control unit 46 for controlling the operation of the transmission unit 45 and the upper light source 44, and a cable 47 for wiring the paper feeder 4 to the scanner 3.

The base frame 42 has a transparent zone 421 at the bottom which is covered by a transparent sheet made of a plastics, glass or other desirable materials. The transparent zone 421 enables light to pass through and also may prevent dusts from entering into the paper feeder 4 or prevents documents 411 from dropping out of the paper feeder 4. The bottom of the base frame 42 further has engaging pins 422 engageable with positioning holes formed on the platform 32 so that the paper feeder 4 may be mounted securely and easily on the scanner, and also making the transparent zone 421 aligning with the transparent scanning platform 32.

The channel 43 aims to guide scanning document 411 to move in a predetermined path and direction. It includes a first guide plate (inner plate) 431 spaced from a second guide plate 432 (outer plate) at a selected gap (preferably between 0.7–2 mm) and forms a continuous path consisting of a number of sections. One end of the channel 43 engages with the paper tray 41 for receiving documents 411. The first guide plate 431 is continuous and passes over the transparent zone 421 with a transparent window 433 above a selected location above the transparent zone 421. The second guide plate 432 has another end meeting an edge of the transparent zone 421 and with another edge of the transparent zone 421 connects with another section of the second guide plate 432 so that the transparent zone 421 becomes a portion of the second guide plate 432 over the scanning platform 32 of the scanner 3. The first guide plate 431 further has a reflection plate 434 and a correction plate 435 located thereunder above the transparent zone 421 at desired positions. The transparent window 433 is an elongate slot which enables light emitted by the upper light source 44 to pass through. The reflection plate 434 is a white plate with desirable reflection property or a diffusion plate. The correction plate 435 is for correcting and adjusting brightness and darkness like the one used in a conventional scanner. The size of the transparent window 433, reflection plate 434 and correction plate 435 are smaller than the transparent zone 421.

The upper light source 44 is located above the transparent window 433 and opposite to the transparent zone 421 and can project light to pass through the transparent window 433, transparent zone 421, scanning platform 32 and reaches the scanning means 33.

The transmission unit 45 connects the paper tray 41 with the channel 43 for moving scanning documents 411 one by one along the channel 43 to pass over the transparent zone 421. In the embodiment shown in FIG. 2, the transmission unit 45 includes a paper picking roller 451, a paper separation means, a paper transporting roller 452, a paper discharging roller 453 and a plurality of idlers 454, 455, 456 and 457. The paper picking roller 451 and paper separation means are located at one end of the channel 43 and engages with the paper tray 41 for picking up one sheet of document at a time from the paper tray 41 and feeding the document into the channel 43. The paper separation means includes an idler 454 and a friction strip (not shown in the figure). Its structure is known in the art and forms no part of this invention, and therefore will be omitted here. The paper transporting roller 452 is located in the middle portion of the channel 43 and between the paper picking roller 451 and the transparent window 433. It moves the scanning document to the transparent zone 421. The paper discharging roller 453 is located at another end of the channel 43 for discharging document 411 that has been scanned at the transparent zone 421 out of the paper feeder 4. The idlers 454, 455, 456 and 457 couple respectively with the rollers 451, 452, 453 to facilitate document 411 movement. There is a sensor 48, preferably a microswitch, adjacent the paper transporting roller 452 to detect if the document 411 being moved to a selected location in the channel 43.

The control unit 46 is wired to the transmission unit 45 and the upper light source 44 for controlling their operation. The cable 47 connects the paper feeder 4 with the scanner 3, and couples the control unit 46 with a control circuit board 31 of the scanner 3.

Through above wiring and coupling, signal transmission between the control unit 46 and the control circuit board 31 may be performed in coordinated manner with the motion of the transmission unit 45, upper light source 44, lower light source 331 and the scanning means 33.

When in use, the base frame 42 is mounted on the platform of the scanner 3 with the transparent zone 421 located above the scanning platform 32. The scanning means 33 is moved to the correction plate 434 for setting required brightness/darkness parameters. Then the scanning means 33 is moved under the reflection plate 434 (for reflection type scanning) or moved under the transparent window 433 (for transparency scanning). Thereafter the transmission unit 45 picks up a document 411 from the paper tray 41 and moves the document 411 to the transparent zone 421 for scanning process.

If the document is a transparency, the scanning means 33 will be located under the transparent window 433 (indicated by solid line in FIG. 2). The upper light source 44 will be turned on while the lower light source 331 will be turned off. If the document is opaque, the scanning means 33 will be moved under the reflection plate 434 (shown by broken line in FIG. 2), the upper light source 44 is turned off while the lower light source 331 is turned on, then a reflective scanning will be performed for the passing document 411.

Figure 3:
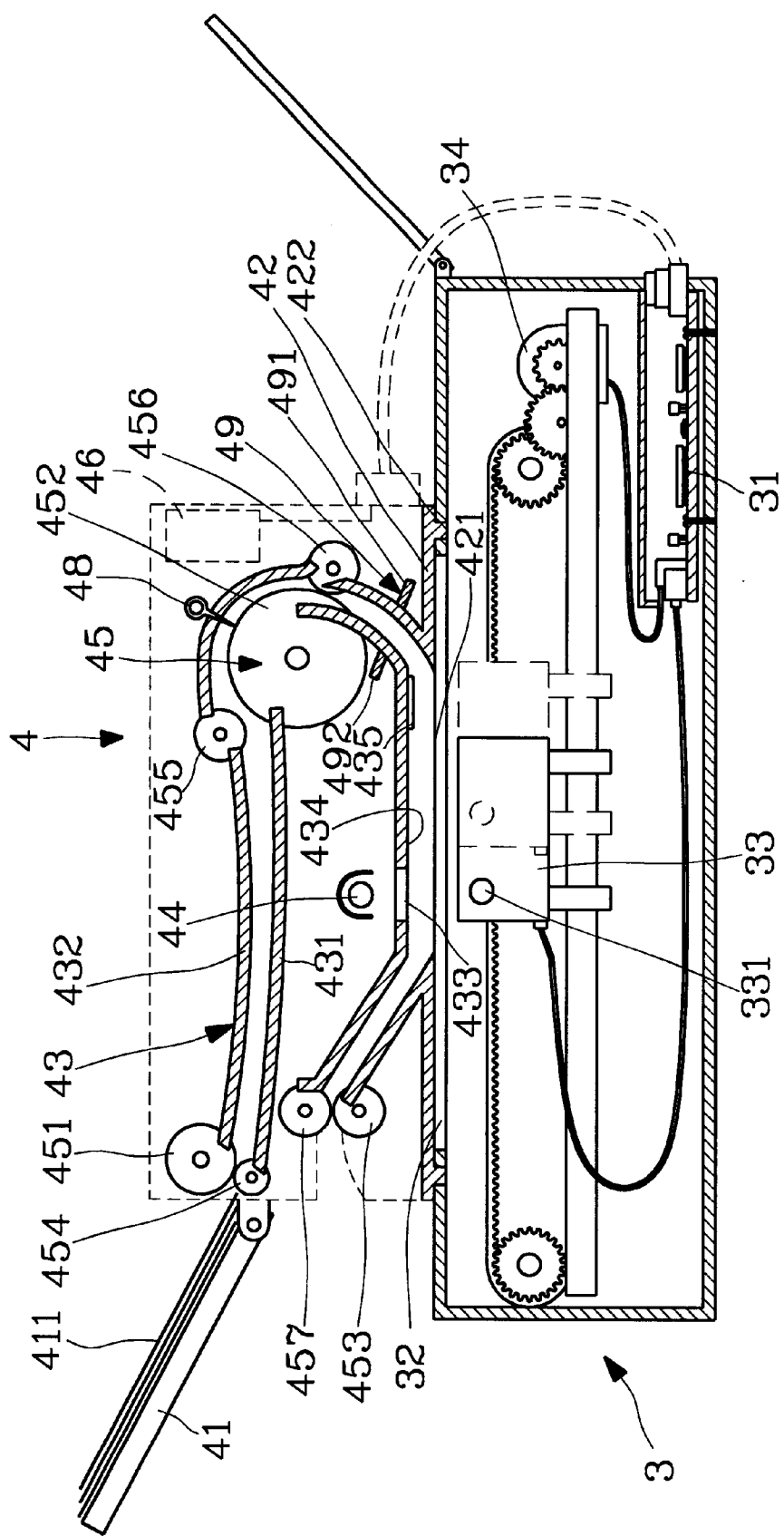
FIG. 3 is a sectional view of another embodiment of this invention used with a scanner.

FIG. 3 shows another embodiment of this invention. Like components as shown in FIG. 2 will be marked by like numerals. It is constructed substantially like the one shown in FIG. 2 except that a pair of photo sensors 49 being disposed at the channel 43 beyond the transporting roller 452 but in front of the transparent zone 421. The photo sensors 49 includes an emission member 491 and a receiving member 492 located respectively at two sides of the channel 43. When a transparency document 411 passes through the photo sensors 49, the receiving member 492 will receive a strong signal which will then trigger the scanning means 33 to move under the transparent window 433 for transparency scanning under the upper light source 44. When an opaque document passes through the photo sensors 49, the receiving member 472 will receive weak or no signal, then the scanning means 33 will be moved under the reflection plate 434 for reflective scanning through the lower light source 331.

The selection of transparency scanning or reflective scanning may be determined by one of the following methods:

1. Using photo sensors 49 shown in FIG. 3 to detect if a document is transparent or opaque to automatically switch scanning mode. Mixed document types may be placed in the paper tray 41.
2. Using computer softwares and user commands to select which scanning mode desired. This method may be used when the scanner is hooked up with a computer.
3. Using a switch (not shown in the figure) installed on the automatic paper feeder 4 or the scanner 3 to make selection manually.

It may thus be seen that the objects of the present invention set forth herein, as well as those made apparent from the foregoing description, are efficiency attained. While the preferred embodiments of the invention has been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An automatic paper feeder including an upper light source, comprising:
    a paper tray for holding at least one sheet of scanning document;
    a base frame having a transparent zone at a bottom thereof;
    a channel for guiding movement direction and path of the scanning document having one end thereof engageable with the paper tray, another end thereof extending beyond the transparent zone to enable the scanning document be moved over the transparent zone and a transparent window located above the transparent zone,
    an upper light source located above the transparent window; and
    a transmission unit linking the channel and the paper tray for moving the scanning document from the paper tray over the transparent zone.

2. The automatic paper feeder of claim 1, wherein the paper feeder is used with a scanner, the scanner having a transparent scanning platform upon which the base frame being mounted with the transparent zone disposed above the scanning platform to form a scanning area therebetween to scan a passing scanning document.

3. The automatic paper feeder of claim 2, wherein the base frame and the scanner have respectively a positioning means to engage with each other for the transparent zone to mate against the scanning platform.

4. The automatic paper feeder of claim 3, wherein the positioning means includes at least one pin under the base frame and at least one positioning hole on the scanner, the pin being engageable with the hole.

5. The automatic paper feeder of claim 2, wherein the transparent window is smaller than the transparent zone, the channel further having a reflection plate located above the transparent zone.

6. The automatic paper feeder of claim 2, wherein the transparent window is smaller than the transparent zone, the channel further having a correction plate located above the transparent zone.

7. The automatic paper feeder of claim 2, wherein the scanner further has a scanning means movable across the scanning platform for scanning process, the scanning means being moved to a desired position before the transmission unit starts moving the scanning document to the transparent zone to form a paper feeding scanning process.

8. The automatic paper feeder of claim 2, wherein the transparent window is smaller than the transparent zone, the channel facing the transparent zone includes the transparent window, a reflection plate and a correction plate, the scanner further including a scanning means which has a lower light source, and which being movable across the scanning platform; the scanning means being moved under the transparent window with the upper light source turned on and the lower light source turned off for scanning a transparent document; the scanning means being moved below the reflection plate with the upper light source turned off and the lower light source turned on for scanning an opaque document.

9. The automatic paper feeder of claim 2, wherein the scanner further has a control circuit board and a scanning means which has a lower light source and which being movable across the scanning platform, the scanning means and the lower light source bing controllable by the control circuit board, the automatic paper feeder further including:
    a control unit wiring with the transmission unit and the upper light source for controlling operation of the transmission unit and the light source, and
    a cable wiring the automatic paper feeder to the scanner for coupling the control unit with the control circuit board to coordinate signal transmission between the control unit and the control circuit board, and to coordinate motion among the transmission unit, upper light source, lower light source and scanning means.

10. The automatic paper feeder of claim 1, wherein the transmission unit includes:
    a paper picking roller located at where the channel engages with the paper tray for feeding the scanning document held in the paper tray to the channel;
    a paper transporting roller located between the paper picking roller and the transparent zone for moving the scanning document to pass over the transparent zone; and
    a paper discharging roller located at another end of the channel for moving the scanning document from the transparent zone to outside of the automatic paper feeder.

11. The automatic paper feeder of claim 10 further having a pair of photo sensors located at a middle portion of the channel between the paper picking roller and the transparent zone, the photo sensors including an emission member and a receiving member located respectively at two sides of the channel for detecting if a passing scanning document in the channel is transparent.

12. The automatic paper feeder of claim 2, wherein the channel includes a first channel guide spaced from a second channel guide for the scanning document to move therebetween, the second channel guide having a part furnishing with said transparent zone to enable the scanning document to expose at the transparent zone, the first channel guide having a transparent window at a desired position above the transparent zone.

13. The automatic paper feeder of claim 2, wherein the transparent window is a narrow slot, the base frame having a transparent sheet to mate against the transparent zone.

14. An automatic paper feeder for use with a scanner to perform reflective and transparent scanning, the scanner having a scanning means movable across a scanning platform for scanning process and a control circuit board for controlling the scanning means which has a lower light source, the automatic paper feeder comprising:

- a paper tray for holding at least one sheet of scanning document,
- an upper light source,
- a base frame mountable on the scanning platform having a transparent zone mating against the scanning platform,
- an upper light source located above the transparent zone for projecting light toward the transparent zone and the scanning platform,
- a transmission unit linking to the paper tray for picking the scanning document from the paper tray and moving the scanning document to pass over the transparent zone,
- a control unit wiring to the transmission unit and the upper light source for controlling operation thereof; a cable connecting the automatic paper feeder with the scanner for signal transmission between the control unit and the control circuit board and coordinates motion among the transmission unit, the upper light source, the light source and the scanning means; said paper feeder having a channel for guiding the scanning document to a desired path and direction, the channel having one end engageable with the paper tray and having another end thereof extending over the transparent zone for the scanning document to move over the transparent zone, the channel further having a transparent window and a reflection plate, the size of the transparent window and the reflection plate being smaller than the transparent zone, the upper light source being located above the transparent window.

15. The automatic paper feeder of claim 14, wherein the transmission unit includes:

- a paper picking roller located at where the channel engaging with the paper tray for feeding the scanning document held in the paper tray to the channel;
- a paper transporting roller located at a middle section of the channel between the paper picking roller and the transparent zone for moving the scanning document in the channel over the transparent zone, and
- a paper discharging roller located at another end of the channel for discharging the scanning document passed the transparent zone out of the automatic paper feeder.

16. The automatic paper feeder of claim 14 further having a pair of photo sensors which includes an emission member and a receiving member located at a middle portion of the channel in front of the transparent zone at both sides of the channel respectively for detecting if a passing scanning document is transparent.

17. The automatic paper feeder of claim 14, wherein the channel includes a first channel guide spaced from a second channel guide for the scanning document to move therebetween, the second channel guide having an end connecting with an edge of the transparent zone which serves as a portion of the second channel guide so that a passing scanning document will be exposed to the transparent zone, the transparent window being located in the first channel guide above the transparent zone.

18. The automatic paper feeder of claim 14, wherein the scanning means is moved to a selected location within the transparent zone before the transmission unit moving the scanning document over the transparent zone for the scanner to perform a paper feeding type scanning process.

19. The automatic paper feeder of claim 18, wherein the scanning means is moved under the transparent window and the upper light source being turned on and the lower light source being turned off for transparency scanning, wherein the scanning means is moved under the reflection plate and the upper light source being turned off and the lower light source being turned on for reflective scanning.

* * * * *